(12) United States Patent
Maliszewski et al.

(10) Patent No.: US 6,467,233 B1
(45) Date of Patent: Oct. 22, 2002

(54) WIND TOWER

(75) Inventors: Leonard P. Maliszewski; Patrick C. Lashley, both of Shreveport, LA (US)

(73) Assignee: Beaird Industries, Inc, Shreveport, LA (US)

( * ) Notice: Subject to any disclaimer, the term of this patent is extended or adjusted under 35 U.S.C. 154(b) by 0 days.

(21) Appl. No.: 09/711,211

(22) Filed: Nov. 9, 2000

(51) Int. Cl.$^7$ .............................................. E04H 12/34
(52) U.S. Cl. ...................... 52/720.1; 52/170; 52/726.4; 52/736.1; 52/736.2; 52/245; 52/725; 290/44; 290/55; 415/208.1
(58) Field of Search ............................ 52/170, 118, 245, 52/246, 247, 296, 726.4, 736.1, 736.2; 60/398; 415/208.1; 455/25

(56) References Cited

U.S. PATENT DOCUMENTS

| | | | | |
|---|---|---|---|---|
| 1,755,608 A | * | 4/1930 | Lemmerman | |
| 2,106,557 A | * | 1/1938 | Putnam | 290/44 |
| 3,073,018 A | * | 1/1963 | Gauthron | 29/421 |
| 3,325,950 A | * | 6/1967 | Pfaff, Jr. | 52/28 |
| 3,768,016 A | * | 10/1973 | Townsend et al. | 325/1 |
| 3,793,794 A | * | 2/1974 | Archer et al. | 52/632 |
| 4,242,851 A | * | 1/1981 | Pohlman et al. | 52/743 |
| 4,272,929 A | | 6/1981 | Hanson | |
| 4,312,167 A | * | 1/1982 | Cazaly et al. | 52/745 |
| 4,565,929 A | * | 1/1986 | Baskin et al. | 290/44 |
| 4,617,768 A | * | 10/1986 | Gebelius | 52/40 |
| 4,935,639 A | | 6/1990 | Yeh | |
| 5,241,797 A | * | 9/1993 | Cliff | 52/192 |
| 5,581,958 A | * | 12/1996 | Cote | 52/40 |

* cited by examiner

Primary Examiner—Carl D. Friedman
Assistant Examiner—Basil Katcheves
(74) Attorney, Agent, or Firm—Buskop Law Group, P.C.; Wendy Buskop

(57) ABSTRACT

A tower for a wind generator made up of a plurality of sections to which are affixed a plurality of transition rings, at least one being conical in shape, a plurality of L-shaped flanges and a T-shaped flange.

18 Claims, 6 Drawing Sheets

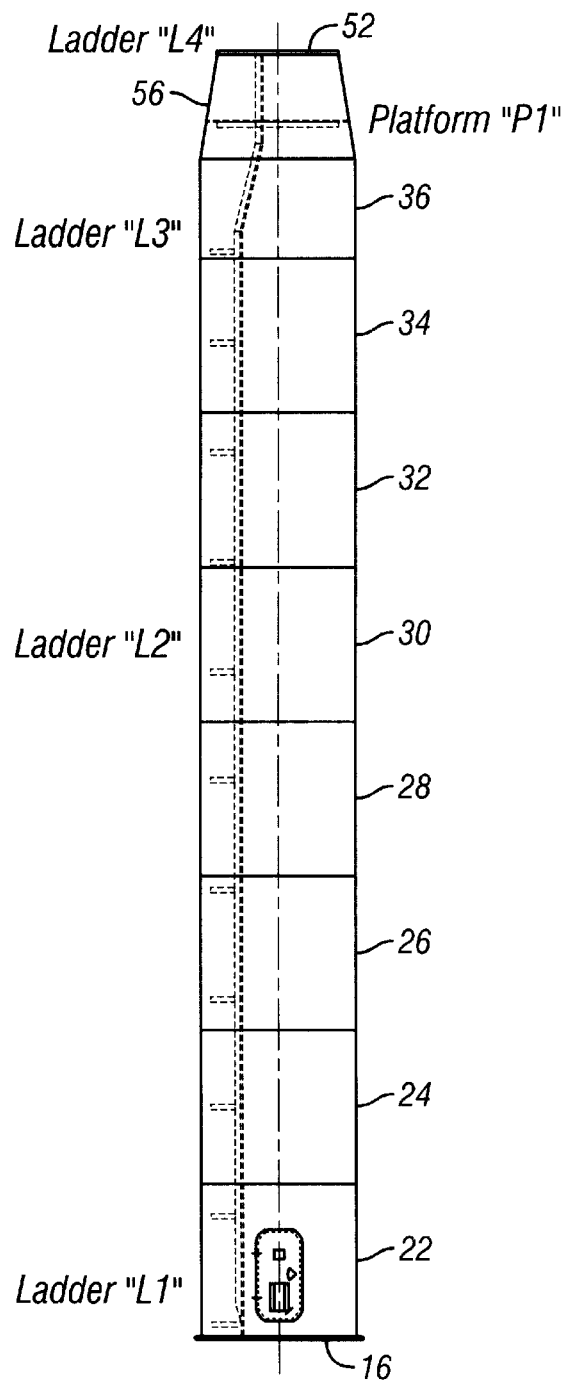
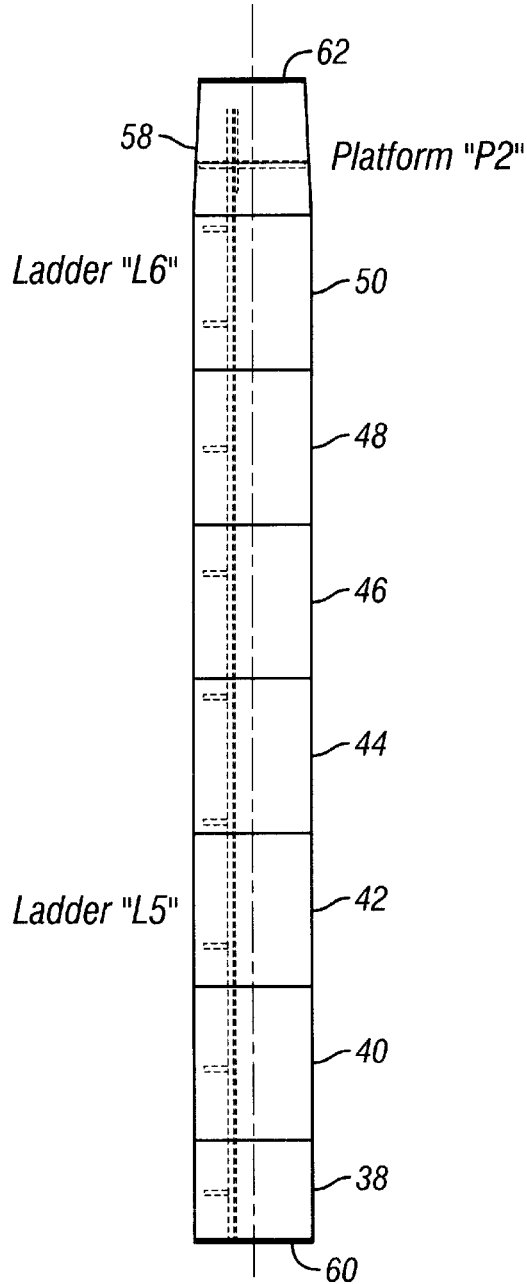
FIG. 4  FIG. 5

WIND TOWER

BACKGROUND OF THE INVENTION

A great deal of interest is presently being shown in the development of alternative energy sources. One type of energy in which people are showing interest in is that from the wind. New and more efficient wind turbine generators are being developed, but these need to be placed on towers which are easy and economical to erect.

Large towers, forty or more feet tall, are needed to support wind turbines and the towers need to withstand strong lateral forces caused by the wind. These towers have in the past required guy wires, large base areas, and are generally not very aesthetic. Other towers have been created which are segments of frustro-conical sections welded together. This welding has required a lot of talent in the field, hence making them expensive to acquire and build. Power towers have been described in recent patents such as U.S. Pat. No. 4,935,639 for a revolving power tower, or U.S. Pat. No. 4,272,929 for a wind tower made from frustro-conical segments welded together, both of which are incorporated by reference.

BRIEF SUMMARY OF THE INVENTION

This invention relates to a unique wind turbine tower and its construction.

The tower of this invention has a plurality of sections with each section being made from a series of welded rings. Each section has rings which are identical in outer diameter however the outer diameter of the bottom section is up to 50% larger than the upper section. The tower is anchored to the ground, preferably by cement and its most preferred version is cylindrical and hollow. Atop the bottom section is affixed a first transition section which can be cylindrical and of the identical diameter as the bottom section, or alternatively, can be conical in shape. If conical, this transition section is preferably a frustro-conical segment. The transition section takes the form of a ring. Atop the upper section is a conical transition ring. The bottom section is bolted to the transition ring. The upper section is bolted to the transition ring. Platforms and ladders are installed on the interior of the tower sections prior to assembly in the field.

A wind turbine generator is placed on top of the upper section, preferably on a bolted flange ring.

BRIEF DESCRIPTION OF THE DRAWINGS

FIG. 4 shows the bottom section of a typical 50 meter, two section wind tower.

FIG. 5 shows the upper section of a typical 50 meter, two section wind tower.

DETAILED DESCRIPTION

The present invention relates to a wind tower which utilizes a stringent and detailed certifying body that specializes in towers and wind turbines, particularly wind towers.

The present invention has been created to build a tower which is tuned to the frequency of the wind turbine generator which is placed on the top of the tower.

The inventive wind tower is constructed using an optimization program which determines the minimum plate thickness needed and structural components required to preclude vibration and harmonic build up in the tower created by the wind generator, while insuring strength in the tower.

The optimization program determines the exact thickness for each individual plate used in the tower construction in order to both achieve minimum steel thickness (thereby reducing materials cost, the cost of transporting the tower, and the cost in man hours to cut the steel or other metal used in the tower), while maintaining structural integrity and overall strength in the tower. Each tower is also designed to various earthquake and wind parameters dictated by specialty certification-governing bodies.

For each tower, the novel method of construction includes, as a step, an independent review and approval of the engineered characteristics of the tower by a specialty certification-body. In one embodiment, the tower certification body of Germanischer Lloyd can be used. In another embodiment, the certification body, Det Norske Veritas of Denmark can be used.

Figure 1:
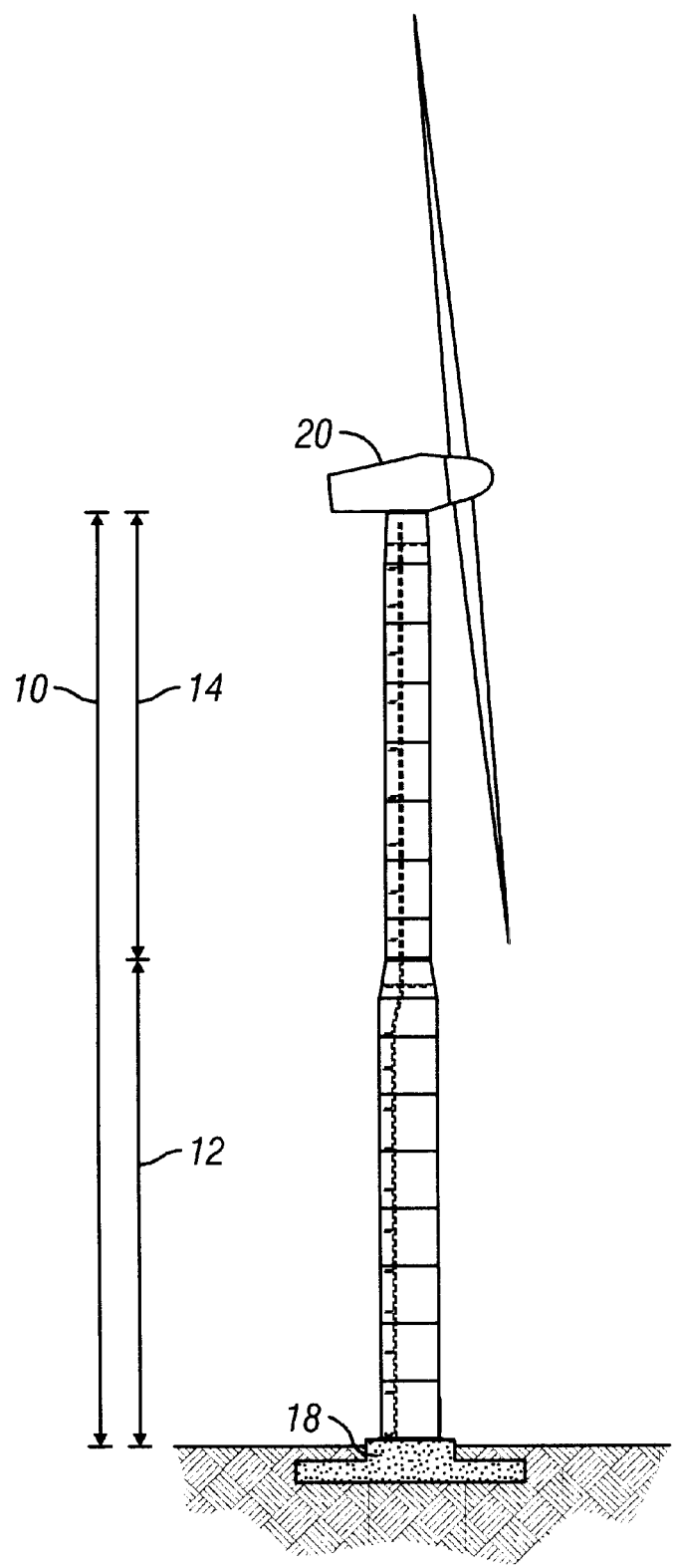
FIG. 1 is a side view of an erected tower embodying the invention with a wind turbine placed on it.

FIG. 1 shows one embodiment of the present invention, a fifty-meter tower. The towers of this invention can range in height from 32 to over 80 meters.

For a typical 50-meter wind tower 10, two tubular sections, preferably cylindrical hollow sections are used, specifically, a bottom section 12 and an upper section 14. The bottom section 12 is connected to a T-shaped flange 16, which is bolted to studs embedded in a concrete foundation 18. The concrete foundation 18 may be of a variety of constructions, such as one which uses threaded rods or other materials to anchor and hold the resulting wind tower erect against the movement caused by the turbine mounted to the top of the tower and when the wind reaches velocities in excess of 100 mph.

Wind tower 10 is designed to support a wind turbine generator 20. Any of a variety of generators could be used, pivoting, stationary, low horsepower, and high capacity turbines. The bottom and upper sections are preferably made from steel, such as cold rolled steel, but other suitable metals can be used as well, such as aluminum or metal alloys The bottom section 12 and upper section 14 of wind tower 10 are preferably constructed from a plurality of rings, each ring having the same outer diameter as the other rings in a section.

Figure 2:
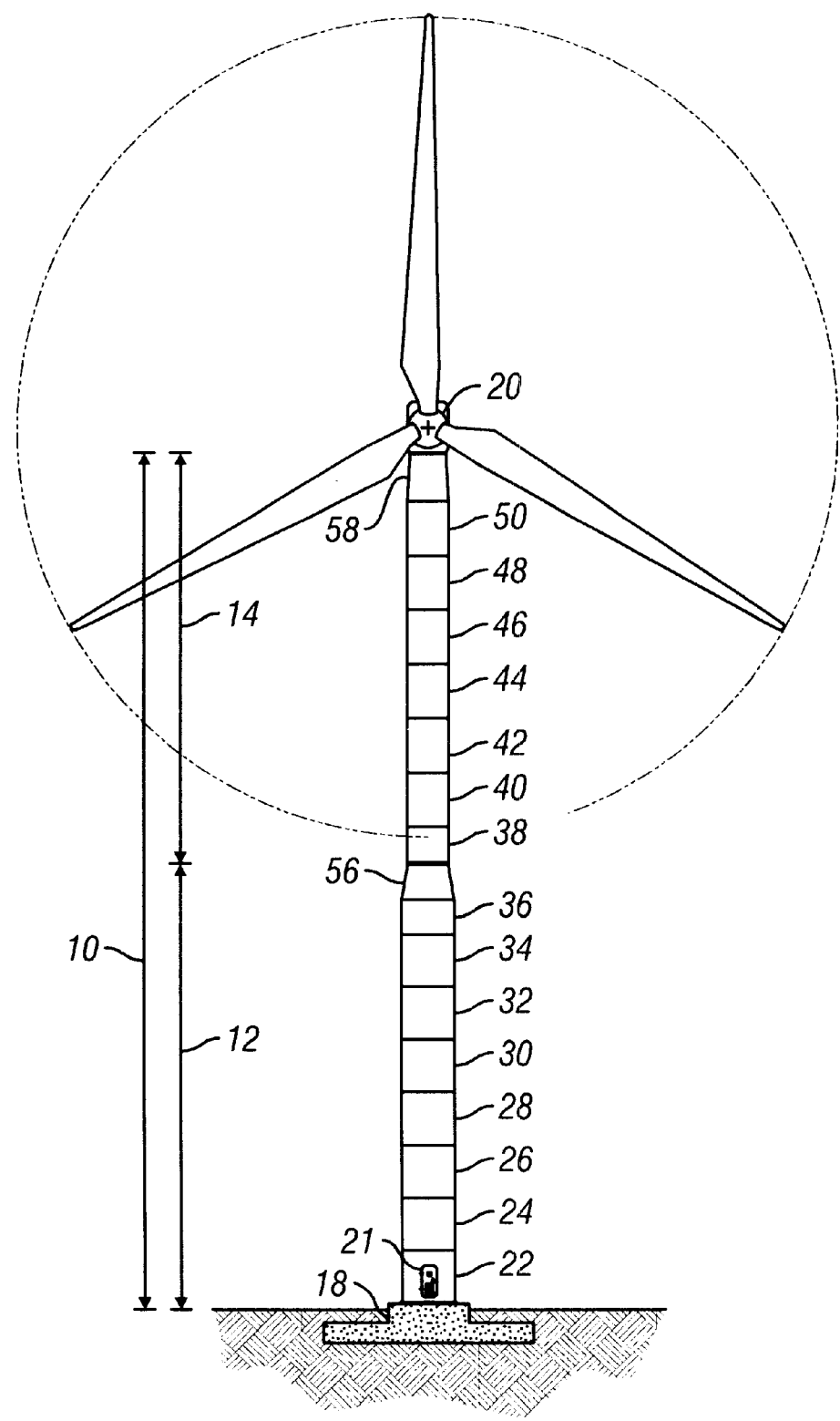
FIG. 2 is a front view of an erected wind tower with a wind turbine placed on the upper section.

FIG. 2 shows a detail of the rings of the bottom section 12, which include first bottom ring 22 which is welded to second bottom ring 24. Third bottom ring 26 is welded to both second bottom ring 24 and fourth bottom ring 28. The additional rings 30, 32, 34 and 36 are welded together in a like manner forming the section. The outer diameter of each ring in the bottom section 12 is identical to the other rings of the section. The outer diameters of each ring, 38, 40, 42, 44, 46, 48, and 50 in the upper section 14 are similarly identical. In one embodiment, the outer diameter of the bottom section is identical to the outer diameter of the upper section. Additionally, the transition ring between the bottom section and the upper section are identical in one embodiment. However, in the most preferred embodiment, the outer diameter of the rings of the bottom section 12 differ from the outer diameter of the rings in the upper section 14. The outer diameter of the rings of section 12 are preferably larger than the outer diameter of the upper section, and are contemplated to be up to approximately fifty (50%) larger in diameter than the outer diameter of the rings of section 14.

The rings for the bottom section 12 and the upper section 14 shown in both FIGS. 1 and 2 are pre-welded to each other at the factory site in the most preferred embodiment. It is within the scope of the invention to consider welding the rings to each other at the tower site to form a section.

The overall size of the subsequently created sections is selected so that the sections can be transported from the factory to the site in an economical manner and with the least number of road permits. It is contemplated that a tractor-trailer or a trailer could be successfully used as a transport device to move the sections.

For larger towers, such as those 60 to 80 meters in height, a bottom section 12, and upper section 14 and middle section (not shown) may be needed. In towers over 80 meters in height, four sections are contemplated, namely a bottom section 12, an upper section 14, and two additional sections. The additional sections can be bolted together with similar L shaped flanges. One or more or transition rings can be used with bottom section 12, upper section 14, or these additional sections. The additional transition rings can be conical in shape if the diameters of the sections to be connected differ. The additional transition rings may be cylindrical in shape, if the sections have identical diameters. In the most preferred embodiment, all of the additional transition rings are preferably welded onto the additional sections at the factory.

In the preferred embodiment, a door 21, is placed in the bottom section 14, to permits access to the interior of the tower for painting, bolt tightening or wind turbine maintenance. In a preferred embodiment, the door is a water resistant door, such as a door with an encapsulated gasket, which additionally, can be locked.

Figure 3:
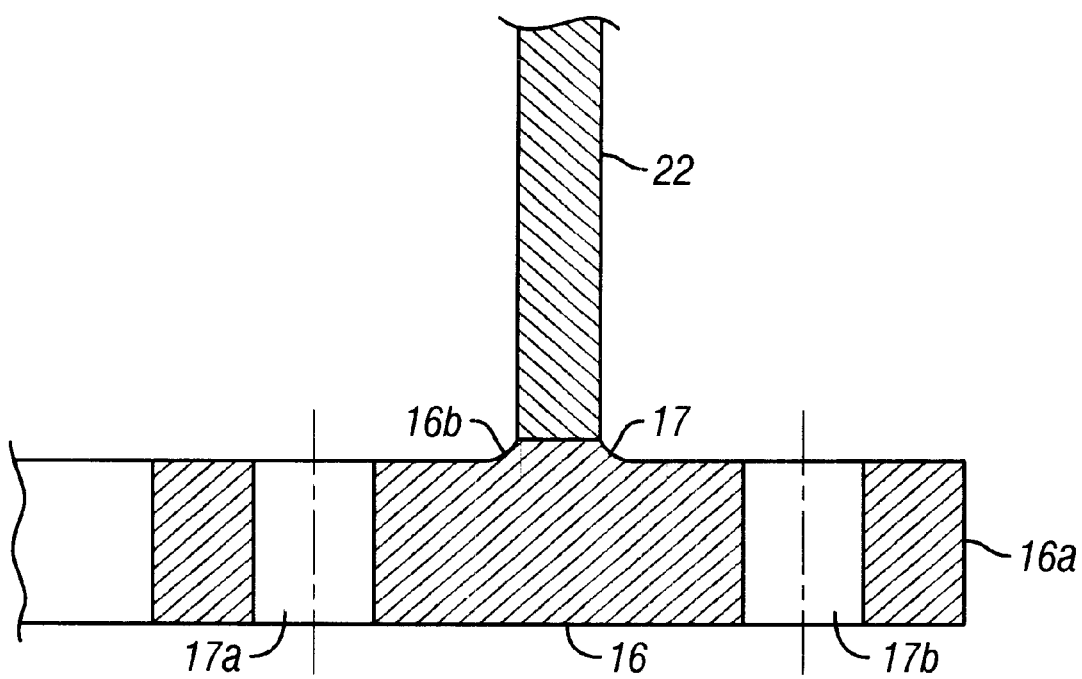
FIG. 3 shows the T-shaped flange which secures to the lowest part of a bottom section of a tower to a foundation.

FIG. 3 shows a welded T-shaped flange 16 having a stub 17, with the T shaped flange being located at the lower end of bottom section 12. Stub 17 aids in the alignment and welding of T-shaped flange 16 to ring 22. Bolt holes on the inside and outside bolt circles in T-shaped flange 16 allows wind tower 10 to be secured to the anchor bolting of found foundation 18.

FIG. 4 shows a bottom section 12 having the plurality of welded rings 22 to 36 and a first conical transition ring 56.

FIG. 5 shows the upper section 14 made from a plurality of welded rings 38, 40, 42, 44, 42, 48 and 50 with each ring having identical outer diameters. A second L-shaped flange 60 is welded to the bottom ring 38 of the upper section 14. On the top portion of upper section 14, a second conical transition ring 58 can be welded to ring 50.

Both conical transition rings 56 and 58 are preferably reinforced by having thicker plates than the plate thickness used in the adjacent rings 48 and 34 in the sections 12 and 14. In addition, L-shaped flanges 52 and 62, disposed on one side of the transition rings, provide additional support for the stress load transfer from the wind turbine down the tower walls.

Where the transition rings are conical, it is preferred that the conical transition rings, such as rings 56 and 58 be hollow, frustro-conical segments, with the first conical transition ring 56 having a slightly larger diameter than the second conical transition ring 60. These rings are initially cut from flat plate in a shape which is designed for the particular wind tower height selected. The cut plate is then rolled, and the ends are welded together, typically using submerged arc welding. The reinforcing of the transition rings can be accomplished by welding a second plate to the interior of the ring.

For a 50-meter tower, supporting a a VGSTAS U47-660 turbine the outer diameter of the bottom section is preferably 118 inches and the upper section outer diameter is 90 and $15/16^{th}$ inches. Other manufacturer's turbines may require different diameters for the bottom section to provide adequate support.

Figure 6:
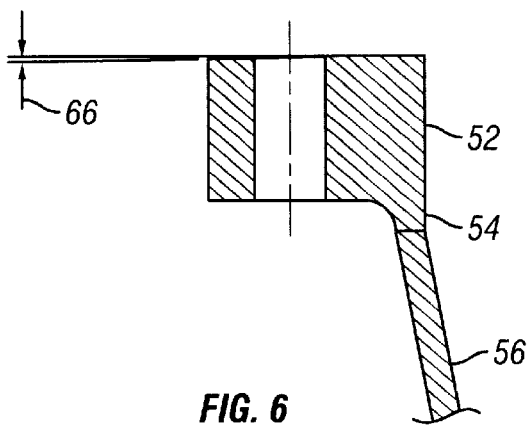
FIG. 6 is a cross sectional view of a first L-shaped flange which secures to the upper section 14 to the bottom section 12.
Figure 7:
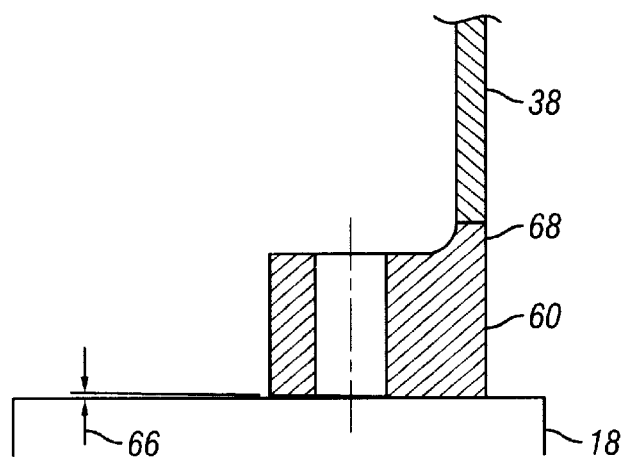
FIG. 7 is a detailed view of the second L-shaped flange, which secures to the bottom section 12 to the upper section.
Figure 8:
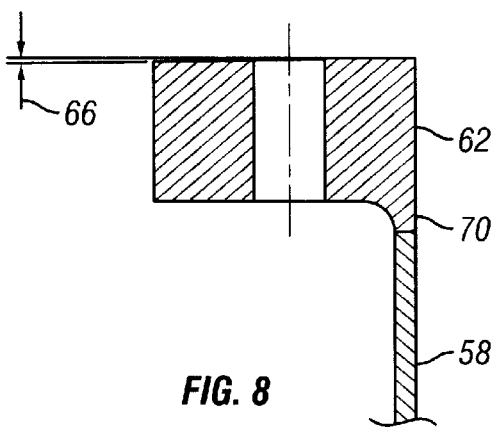
FIG. 8 is a cross sectional view of the third L-shaped flange, which secures to the upper part of the wind turbine generator 20.

A third L-shaped flange 62 is fitted to the top portion of the conical transition ring 50. In the figures, the tower is shown having a first and second conical transition ring. A detail of the first L-shaped flange is shown in FIG. 6 and a detail of the second L-shaped flange is shown in FIG. 7. The third L-shaped flange is shown in FIG. 8. Each L-shaped flange has a sloping side 66 to compensate for warpage during welding.

Returning to FIG. 6, the L-shaped flange has a flange stub 54 and a sloped side 66. The conical transition ring 56 is welded to the stub 64. The sloped side is used so when the stub 64 is welded, the flange aligns flush with the ring. The stub ends facilitate welding the flanges quickly to the ring.

In FIG. 7, the second L-shaped flange is shown with the stub 68 welded to the bottom ring 38 of the top section 12 with the sloped side 66.

In FIG. 8, the third L-shaped flange 62 is shown with stub 70 welded to the top conical transition 58 with the sloped side 66.

Figure 9:
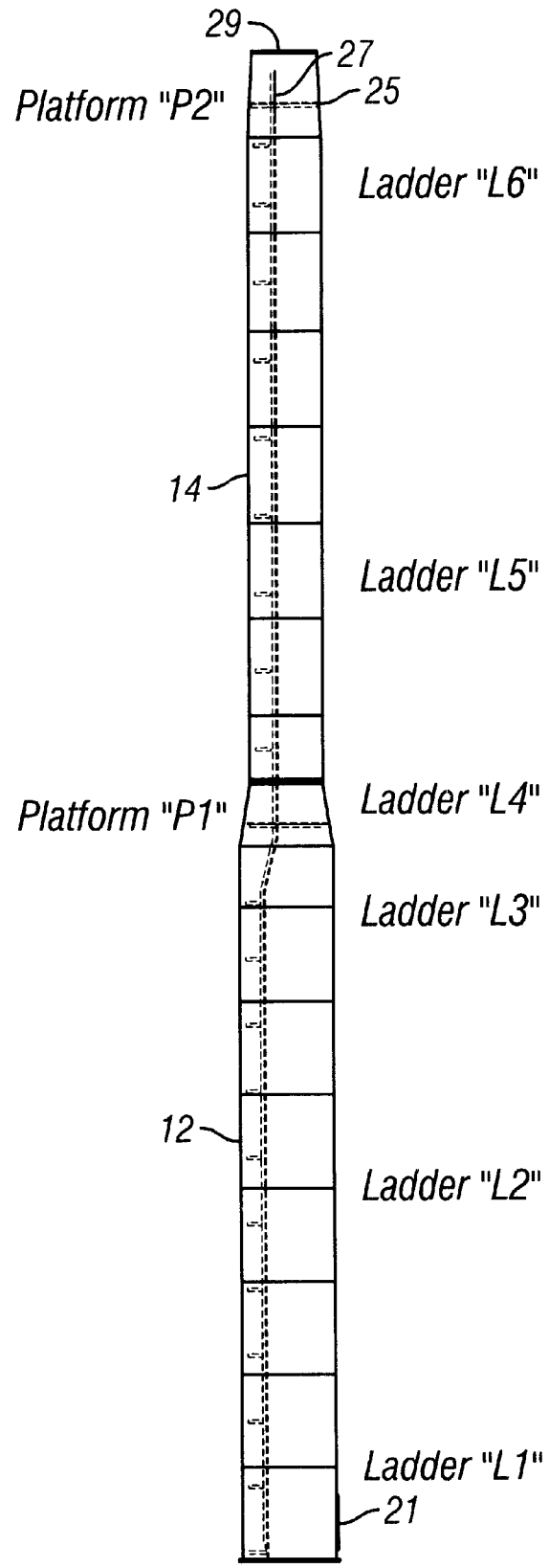
FIG. 9 is a view of an assembled 50 meter tower.

On the interior of the tower, is welded a ladder assembly having parallel legs and rungs disposed between the legs and affixed thereto as detailed in FIG. 9. The ladder is preferably made from of a polymer, PVC, fiberglass, plastic coated metal, laminate structure or combinations of those materials. The ladder is installed to be spaced from the sides of the tower using supporting brackets, which enable maintenance people to use the interior of the tower and repair the wind turbine without the need for any additional safety equipment, such as a safety harness. The unique ladders are constructed so that the back of the maintenance person is in close contact with the interior wall of the tower so that climbing occurs more safely than other position, preferably no more than thirty inches away from the tower wall.

Returning to FIG. 1, it is preferred that a T-shaped concrete foundation 18 be poured into a hole dug in the ground. Other foundation configurations may be possible so long as the combined natural frequency of the wind turbine generator 20, wind turbine tower 10, and concrete foundation 18 meet acceptably frequency criteria. Rebar is included to strengthen the cement surrounding the tower. Studs can extend from the concrete pad 18 to which the metal T-shaped flange 16 which is welded to the bottom section 12, can be attached. The studs can be attached to the flange with bolts or other conventional means.

Concrete foundation 18 not only gives additional stability to the tower, but also assists in dampening the natural frequency vibrations caused by the wind to the tower.

At the top of the tower, there is provided a platform from which a wind turbine generator 20 is installed on L-shaped flange 62 of the top section 14. Pivot pins and conventional mounting means are used to allow the installed wind generator 20 to face the wind direction. Additionally, a middle platform can be installed at a midpoint or other point in the tower from which maintenance work can be done. The ladder can rise vertically through the platform to facilitate maintenance activity on the interior of the tower.

The tower of this invention can be assembled in such a manner to allow only minimum personnel to erect the tower with no specialized welding required. The first step in such a procedure is to excavate a foundation site. It is assumed that the soil around the hole is compact, undisturbed soil, although an engineer prior to construction should verify soil conditions. In compact, undisturbed soil it is found that the best shape of the hole would be relatively narrow and deep, allowing the amount of cement used to be kept to a minimum.

In the hole, concrete foundation 18 is created. Studs are cast into the foundation. The bottom section 12 is placed over the studs and the T-shaped flange 16 of the bottom section 12 is bolted to the studs. The T-shaped flange 16 is welded to one end of bottom section 12. The flanges can be welded to the bottom section 12 at the factory in the most preferred embodiment. In addition, at the factory, a first conical transition ring 56 can be welded to the top of the bottom section 12, on the end opposite the T-shaped flange 16. Also at the factory, a first L-shaped flange 52 can be welded to the first conical transition ring 56, on the end opposite the T-shaped flange 16 of the bottom section 12.

Once the bottom section 12 is in place, the upper section 14 is raised until it reaches the top of the first conical transition ring 56. The upper section 14 consists of a second L-shaped flange 60 welded to the bottom portion of the upper section 14 at the factory in the preferred embodiment. The second L-shaped flange 60 is then bolted to the first L-shaped flange 52 in the field. No field welding is necessary to secure the bottom section 12 to the upper section 14. At the factory, a second conical transition ring 58 is welded to the edge of the upper section 14 which is opposite the edge of the second L-shaped flange 60. The second conical transition ring 58 has welded to it, on the side opposite the second L-shaped flange 60 of the upper section 14, a third L-shaped flange 62. To this third L-shaped flange 62 is bolted the housing for the wind turbine 20.

FIG. 9 shows on the interior of the wind tower 10 where one or more platforms can be optionally secured. One platform is contemplated for the top of the tower. The platforms are preferably bolted to studs welded to the interior of the tower. The welding preferably occurs at the factory prior to shipping of the sections to the field. In the most preferred embodiment, the tower is shipped with the ladder and the platforms already installed, so that there is minimal field assembly work needed.

To reduce the possibility for destruction of the wind turbine generator, the tower supporting the generator must be sufficiently strong to withstand winds in excess of 100 miles per hour. Some designs may require towers capable of enduring winds of 160 mph. Towers of this design can be easily modified after the initial machine is placed on the tower. If, for example, the user of the tower wishes to support a heavier load or perhaps a different machine requiring a different connection, all that need be done is to reverse the steps of assembly, unbolting and lowering the machine and unbolting and lowering the various sections to starting at the top until the section which is desired to be replaced is removed. For a different type of machine, all that may be required is removing the uppermost section and replacing it with a similar section having a different means for attaching the new machine to the tower. For a heavier machine, replacement may require changing the structure of the sections to strengthen them.

The invention contemplates using cylindrical sections. For a specific example, it is contemplated that for a 50-meter tower the bottom section could have 7 rings, preferably each of the exact same outer diameter and the upper section would have 8 rings, with each ring having the exact same outer diameter.

In the example, the conical transition rings for the 50-meter tower preferably have a slope of up to 10 degrees.

The tower may include one coat of 20-year life paint to prevent corrosion. The tower may have optional equipment, such as two grounding lugs attached to the bottom section 12 for grounding of lightening.

A control box for the wind generator turbine would be located on the interior of the tower, supporting the power and signal cables from the turbine.

As an example, an 80-meter tower may consist of 4 sections with 3 conical transition rings. In the bottom section, 6 rings could be used, 6 rings could be in the second section, 6 rings could be in the third section and 6 rings could be in the upper section. The diameter of the bottom section may be equal to the second section, which could be 5% larger than the third section, which could be equal to the upper section. Platforms would be preinstalled in the tower at the top of each section. A marine door would be installed in the bottom section. A ladder would rise from ground level in the bottom section to the top most platform upper section on the interior of the tower.

What is claimed is:

1. A tower for supporting a wind turbine generator comprising:
    a T-shaped flange dispose adjacent a concrete foundation;
    a bottom section having a first end and a second end, said first end being welded to said T-shaped flange and wherein said first end with said T-shaped flange are anchored to the cement foundation;
    a first conical transition ring having a first edge and a second edge, said first edge welded to said second end, and said second edge welded to a stub end of a first L-shaped flange;
    an upper section comprising a first upper end and a second upper end;
    a second L shaped flange welded on a stub end of said second L shaped flange to said first upper end; and
    a first conical transition ring having a first conical edge and a second conical edge said first conical edge welded to said second upper end and said second conical edge welded to stub end of a third L-shaped flange.

2. The tower of claim 1, wherein said first, second and third L-shaped flanges have a sloping side to compensate for warpage due to welding.

3. The tower of claim 1, wherein the bottom section, the transition ring, and the upper section are hollow and cylindrical all of the same diameter.

4. The tower of claim 1, further comprising a water resistant door located in the base of said lower section.

5. The tower of claim 4, wherein said door is a locking marine door with encapsulated gasket.

6. The tower of claim 1, wherein the bottom section has a outer diameter up to 50% larger than the outer diameter of the upper section.

7. The tower of claim 1, further comprising a ladder mounted on the interior of said tower extending from the first end of the bottom section to the second upper end of the upper section.

8. The tower of claim 1, wherein said bottom section and said upper section have identical geometric shapes.

9. The tower of claim 1, wherein the bottom section and upper section and conical transition rings consist of metal plates which are optimized in thickness to minimize destructive structural vibration and minimize construction costs.

10. The tower of claim 1, having an overall height of 50 meters, and consisting of a bottom section comprising 7 rings and an upper section comprising 8 rings, and wherein the outer diameter of the rings of the bottom section is up to 30% larger than the outer diameter of the rings of the upper section.

11. The tower of claim 10, wherein the rings of the bottom section and the upper section are cylindrical.

12. The tower of claim 11, which is the slope of the conical transition rings, is up to 10 degrees.

13. The tower of claim 1, further comprising two grounding straps for grounding of lightening.

14. The tower of claim 1, further comprising supports for power and signal cables connecting the wind generator turbine to a control box mounted on the interior of said tower.

15. The tower of claim 1, further comprising at least one platform mounted on a plurality of studs welded to the interior of said tower.

16. The tower of claim 1, having an overall height of a 80 meters and consisting of six rings in said bottom section, six rings in a middle section, six rings in a third section and six rings in said upper section, and wherein the outer diameter of said rings of said bottom section is larger than the outer diameter of said rings of said middle section, and wherein the outer diameter of said rings of said middle section is larger than the outer diameter of said rings of said third section and wherein said outer diameter of said rings of said third section is larger than the outer diameter of said rings of said upper section.

17. The tower of claim 16, wherein said bottom section, upper section, second section, middle section and third section consist of a cylindrical shape.

18. The tower of claim 1, wherein said transition ring is conical in shape.

* * * * *